United States Patent Office.

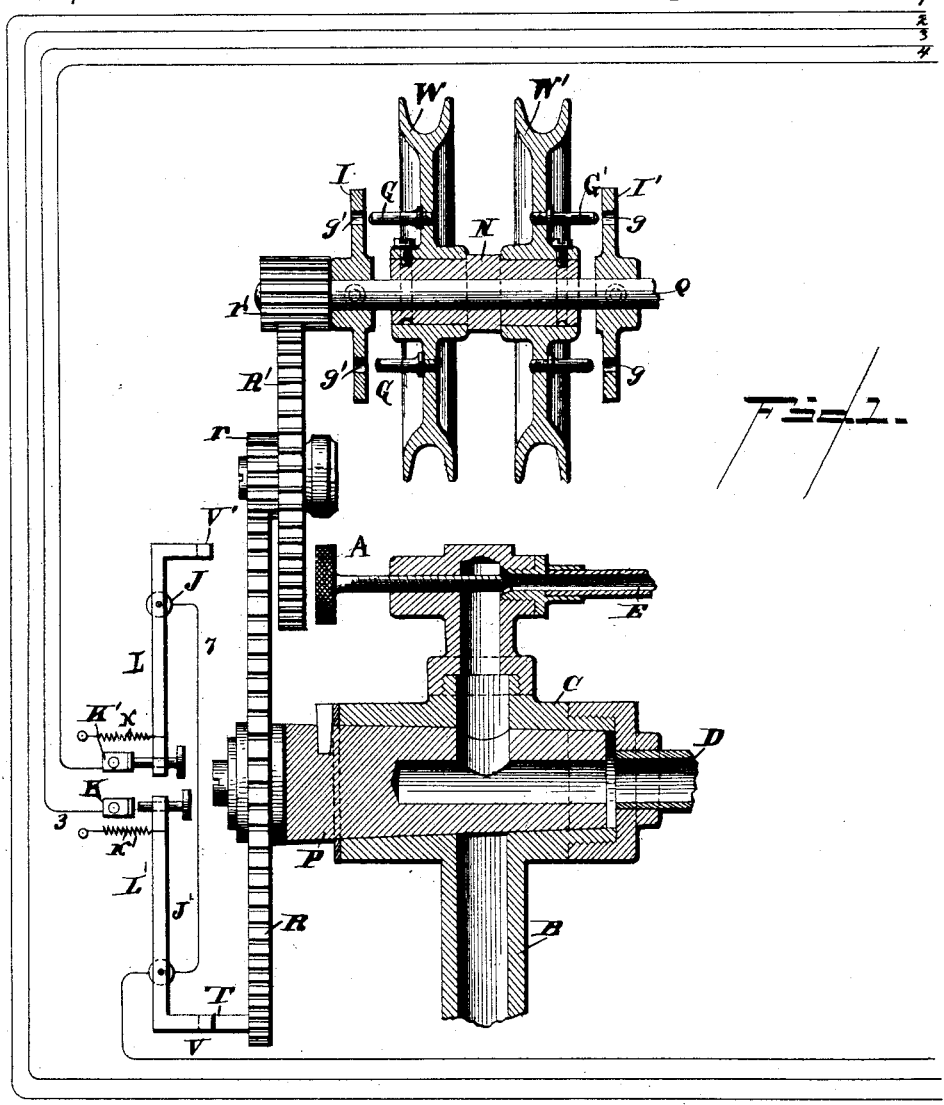

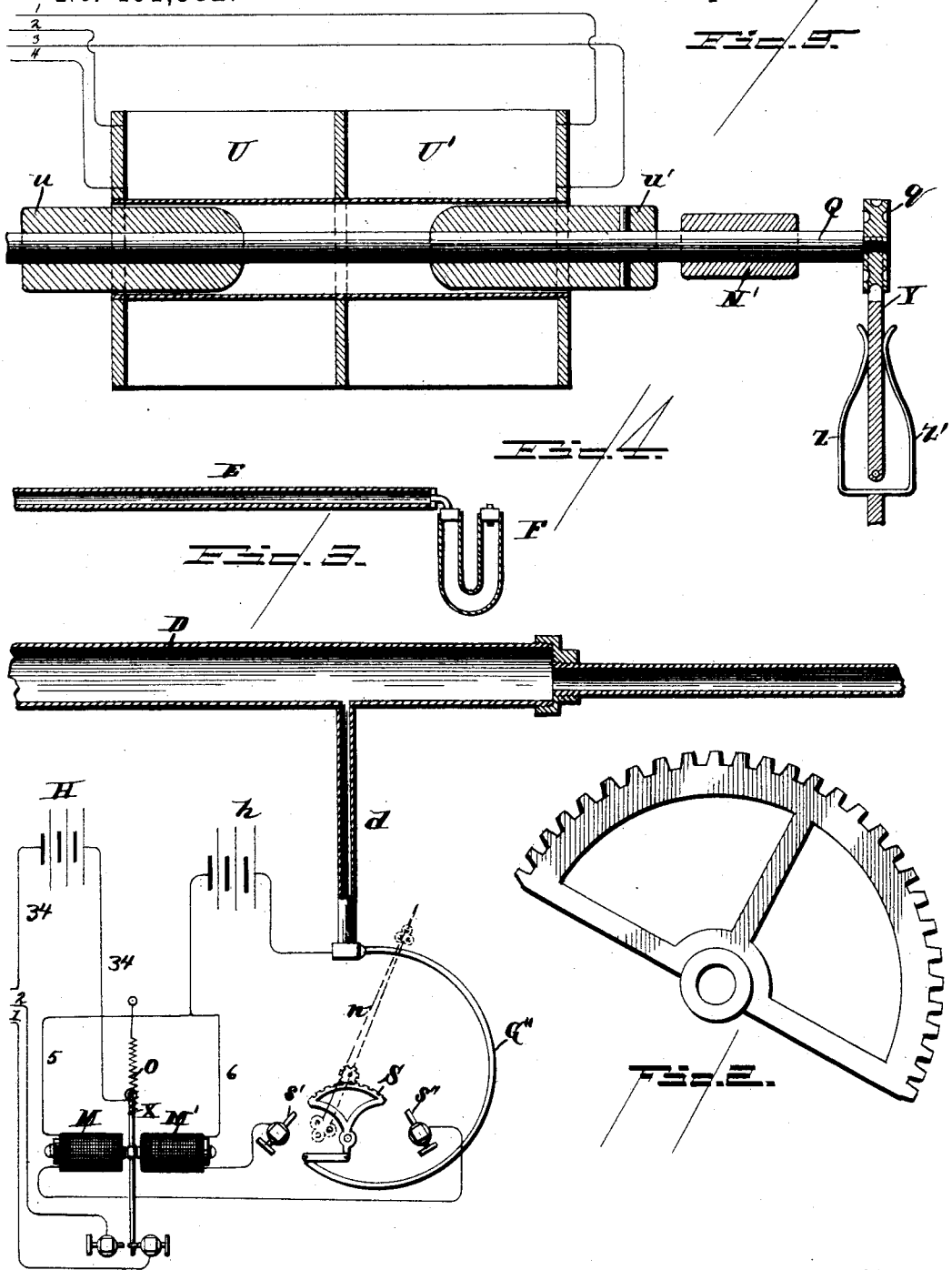

JAMES WARD PACKARD, OF NEW YORK, N. Y.

VALVE-ACTUATING APPARATUS.

SPECIFICATION forming part of Letters Patent No. 401,582, dated April 16, 1889.

Application filed September 11, 1888. Serial No. 285,125. (No model.)

*To all whom it may concern:*

Be it known that I, JAMES WARD PACKARD, a citizen of the United States, residing at New York, in the county of New York and State of New York, have invented certain new and useful Improvements in Valve-Actuating Apparatus; and I do hereby declare the following to be a full, clear, and exact description of the invention, such as will enable others skilled in the art to which it appertains to make and use the same.

My invention consists in an automatically-operated valve for attachment to mercury air-pumps.

Figure 1 shows the apparatus in diagram. Fig. 2 is a detail view of one of the gear-wheels. Fig. 3 is to be taken in connection with Fig. 1, and shows an extension of the suction-pipe of the pump, together with the gage, relay, and electrical connections. Fig. 4 is to be taken in connection with Fig. 1, and shows an extension of the air-inlet tube of the pump with drying-tube attached; Fig. 5, to be taken in connection with Fig. 1, and shows the magnets controlling the clutch.

It is well known that mercury vacuum-pumps of the kind described in Patents No. 327,313, September 21, 1885, and No. 339,930, April 13, 1886, granted to Reinmann and Ott, are operated through the alternate exhaustion and admission of air by a mechanical air-pump.

The herein-described apparatus is of such mechanical and electrical construction that when the necessary vacuum has been produced the valve will be automatically turned and air admitted. When complete air-pressure has been restored, the valve will automatically shut off all connection with the atmosphere and reopen connection with the mechanical air-pump, whereby the mercury-pumps are continuously operated without care or attention on the part of the operator.

In the drawings, tube D is connected with the mercury-pumps. (Not shown.) The plug P in the valve-casing C throws this tube D into connection either with the tube B, leading to the mechanical air-pump, or with the tube E, which is connected with the atmosphere through the drying-tube F, according as it is turned one way or the other. The revolution of the plug P is caused by the gearing R $r$ R′ $r'$ leading to the shaft Q. Upon the bearing N are the pulley-wheels W W′. These wheels are not directly mounted upon the shaft Q, but upon a bearing, N. This bearing N is cored out to form a sleeve, within which the shaft Q revolves. Upon the shaft Q are pieces of soft iron $u$ $u'$, which are acted upon, respectively, by the electro-magnets U U′. When either of these electro-magnets is excited by a current passing through its coils, it acts upon the adjacent armature and causes the shaft Q to move endwise in its bearings N N′ and throws either the plate I or I′ into gear with the pulleys W W′. This clutch action is caused by the studs G G′ entering the holes $g$ $g'$ in the clutch-faces I or I′. The pinion $r'$ is made with a broad face, so that it always gears with the gear-wheel R′. The lever Y has a clutch which gears into the groove in the wheel on the end of the shaft Q, and by the action of the spring Z Z′ the shaft Q is kept in its central position and out of gear with the pulleys W W′ when neither of the electro-magnets U U′ is in action.

The operation of the electrical part of my invention is the following: The Bourdon gage G″ is connected with the tube D by means of the branch $d$. This tube expands or contracts according to the degree of air-pressure within it, thereby moving the sector S and the needle $n$, which shows the degree of air-pressure within the tube D. At the extremities of its vibration the sector S makes contact with one of the pieces $s'$ or $s''$. By so doing it throws the battery $h$ into circuit with one or the other of the magnets M M′ through the electrical connections 5 and 6, thus forming an electrical switch. Suppose that the highest degree of vacuum possible has been produced by the action of the mechanical pumps, and it is desired to shut off the pump, admit the air, and thereby reverse the action of the mercury-pumps. Such a high degree of vacuum will have contracted the tube G and made contact between the sector S and the point or piece $s'$. This has thrown the magnet M′ into circuit with the battery $h$ and drawn the needle X into the position shown in the drawings.

The needle X is held in either position of its adjustment by the spring O. This has completed the circuit through the battery H, the wire 34, the needle X, the wire 1, the electromagnet U', the wire 3, the lever L', by means of the contact-piece K and the connection 34, back to the battery H. This exciting of the magnet U' caused the shaft Q to move to the left and threw the clutch-face I' into gear with the pulley W'. The immediate effect of this was to throw the train of gearing into operation and begin a half-revolution of the plug P of the air-valve. As the valve nearly completed its semi-revolution and began to open connection between the tubes D and E, of course the vacuum began to go down and contact between the sector S and s' was broken; but the spring O held the needle X in the position shown, and the circuit being complete the magnet U' continued in operation and the valve continued to revolve until the stud T, striking the beveled face V on the lever L, broke the contact at K, and thereby threw the magnet U' and the clutch I' out of operation and out of gear. This was not accomplished, however, until the valve had made a complete semi-revolution and the connection with the tube E was wide open. As the air rushes in through the tubes E and D at a rate controlled by the screw-plug A, the gage-tube G'' will expand and the sector S swing over until contact with the piece s'' is made. This will throw the magnet M into circuit with the battery h and the needle X will be drawn to the left. This will complete the circuit through the battery H, the wire 34, the needle X, the wire 2, the magnet U, the wire 4, the contact K', the lever L, the wire 7, and the wire 34 back to the battery H. The operation of the electro-magnet U will throw the clutch-face I into gear with the pulley-wheel W, and the train of gearing will again operate and revolve the valve-plug P back through its half-revolution until the stud T engages with the beveled face V' on the end of the lever L, thereby breaking the contact at K' and bringing the apparatus again to a standstill. The levers L and L' are pivoted to points J and J' and controlled by the springs k k', respectively.

A detailed view of gear-wheel R in Fig. 2 shows a large part of said gear-wheel cut away. This is done so that if, for any reason, the circuit-breaking apparatus operated by said gear-wheel should fail to act, the mechanism would not continue to operate and break the pump-valve. It is evident that when the valve is thrown a short way beyond its normal position, the pinion would fail to gear longer with the wheel R and the clutch would run idly without affecting the valve itself.

The pulley-wheels W W' revolve continuously and in opposite directions.

Having therefore described my invention, both in essence and detail, what I claim as new, and desire to protect by Letters Patent, is—

1. The combination, with a two-way cock which connects an air-tight chamber alternately with the atmosphere and with a vacuum-pump, of an electrical switch, a pressure-gage connected with the electrical switch and operated by the varying pressures in the air-tight chamber, a magnet excited by the currents controlled by the said switch, the continuously-revolving pulley, and the clutch which intermittently connects the revolving pulley with the two-way cock and is controlled by the magnet, substantially as described.

2. The combination, with a two-way cock which connects an air-tight chamber alternately with the atmosphere and with a vacuum-pump, of an electrical switch, a pressure-gage connected with the electrical switch and operated by the varying pressures in said air-tight chamber, opposing magnets alternately excited by currents under control of the said switch, continuously and oppositely revolving pulley-wheels, and clutches operated by the opposing magnets which throw the two-way cock alternately into gear with one or the other of the oppositely-revolving pulley-wheels, substantially as described.

3. The combination, with a two-way cock which connects an air-tight chamber alternately with the atmosphere and with a vacuum-pump, of an electrical switch, a pressure-gage connected with the electrical switch and operated by the varying pressures in said air-tight chamber, opposing magnets alternately excited by currents under control of said switch, continuously and oppositely revolving pulley-wheels, and clutches operated by the opposing magnets which throw the two-way cock alternately into gear with one or the other of the oppositely - revolving pulley-wheels, together with a spring which normally holds the clutch in its central position out of gear with both the revolving pulley-wheels, substantially as described.

4. The combination, with an intermittently-operated valve, of a continuously-revolving pulley, an electrically-controlled clutch for intermittently connecting the valve with the continuously-revolving pulley, an automatically-controlled electrical switch, a relay, a second switch operated by the relay to open and close the circuits which control the clutch, and a circuit-breaker in each of said circuits, which circuit-breaker is positively operated by the movement of the valve itself, substantially as described.

5. The combination, with a pressure-gage, of a vibrating arm or indicator for the same, suitable contact-pieces against which the arm strikes, one or more electrical circuits which have the said contact-points and the vibrating arm for terminals, together with a double relay controlled by said circuits, and a positively-controlled vibrating armature for said double relay, which armature can remain at rest only at one or the other extremity of its arc of vibration, substantially as described.

6. In an electrical apparatus for controlling intermittent motion, the combination of an intermittently revolving or reciprocating element, a continuously-moving element, a system of magnets which throw the said intermittently-moving element into gear with the continuously-moving element, the electrical circuit which excites the magnet, the automatically-operated switch which closes the circuit, and the circuit-breaker in the circuit which is positively operated by the intermittently revolving or reciprocating element, substantially as described.

In testimony whereof I affix my signature in presence of two witnesses.

JAMES WARD PACKARD.

Witnesses:
  A. P. SMITH,
  CHAS. H. SONN.